(12) United States Patent
Baldwin

(10) Patent No.: US 8,113,982 B2
(45) Date of Patent: Feb. 14, 2012

(54) EIGHT SPEED PLANETARY KINEMATIC ARRANGEMENT

(75) Inventor: Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 480 days.

(21) Appl. No.: 12/414,027

(22) Filed: Mar. 30, 2009

(65) Prior Publication Data

US 2010/0248890 A1    Sep. 30, 2010

(51) Int. Cl.
*F16H 3/62* (2006.01)
(52) U.S. Cl. .................................... 475/275
(58) Field of Classification Search .............. None
See application file for complete search history.

(56) References Cited

U.S. PATENT DOCUMENTS

| | | | |
|---|---|---|---|
| 7,566,283 B2 * | 7/2009 | Gumpoltsberger | 475/275 |
| 7,628,724 B2 * | 12/2009 | Hart et al. | 475/275 |
| 7,946,949 B2 * | 5/2011 | Hart et al. | 475/284 |
| 8,007,395 B2 * | 8/2011 | Wittkopp et al. | 475/275 |
| 8,007,397 B2 * | 8/2011 | Phillips et al. | 475/277 |
| 2007/0238573 A1 | 10/2007 | Kamm et al. | |
| 2007/0270270 A1 | 11/2007 | Miller et al. | |
| 2007/0281820 A1 | 12/2007 | Kamm et al. | |
| 2007/0287573 A1 | 12/2007 | Kamm et al. | |
| 2008/0009382 A1 | 1/2008 | Kamm et al. | |
| 2008/0009384 A1 | 1/2008 | Diosi et al. | |
| 2008/0009385 A1 | 1/2008 | Kamm et al. | |
| 2008/0015077 A1 | 1/2008 | Kamm et al. | |
| 2008/0015081 A1 | 1/2008 | Kamm et al. | |
| 2008/0064556 A1 | 3/2008 | Kamm et al. | |
| 2008/0161149 A1 | 7/2008 | Diosi et al. | |
| 2008/0182705 A1 | 7/2008 | Hart et al. | |
| 2008/0234093 A1 | 9/2008 | Diosi et al. | |
| 2008/0305911 A1 | 12/2008 | Moorman et al. | |
| 2009/0023540 A1 | 1/2009 | Hart et al. | |

* cited by examiner

*Primary Examiner* — Dirk Wright
(74) *Attorney, Agent, or Firm* — David B. Kelley

(57) ABSTRACT

A multiple speed power transmission comprising: four epicylic gearing assemblies each having first, second, and third rotating elements with specified interconnections, an input shaft, an output shaft, three clutches, and two brakes. Clutches and brakes are applied in combinations of three to produce eight forward ratios and one reverse ratio.

12 Claims, 2 Drawing Sheets

| Gear Number | Number of teeth |
|---|---|
| 22 | 59 |
| 24 | 89 |
| 28 | 15 |
| 32 | 59 |
| 34 | 89 |
| 38 | 15 |
| 42 | 33 |
| 44 | 93 |
| 48 | 30 |
| 52 | 23 |
| 54 | 83 |
| 58 | 30 |

| Ratio # | Brake 60 | Brake 62 | Clutch 64 | Clutch 66 | Clutch 68 | Speed Ratio | Step Size |
|---|---|---|---|---|---|---|---|
| Reverse | X | X | X | | | -3.609 | 86% |
| 1st | X | X | | X | | 4.192 | |
| 2nd | X | X | | | X | 2.869 | 1.46 |
| 3rd | | X | | X | X | 2.037 | 1.41 |
| 4th | | X | X | | X | 1.633 | 1.25 |
| 5th | | X | X | X | | 1.233 | 1.32 |
| 6th | | | X | X | X | 1.000 | 1.23 |
| 7th | X | | X | X | | 0.870 | 1.15 |
| 8th | X | | X | | X | 0.688 | 1.26 |

Fig. 3

EIGHT SPEED PLANETARY KINEMATIC ARRANGEMENT

BACKGROUND OF THE INVENTION

This invention relates to the field of automatic transmissions for motor vehicles. More particularly, the invention pertains to a kinematic arrangement of gearing, clutches, brakes, and the interconnections among them in a power transmission.

BRIEF DESCRIPTION OF THE DRAWINGS

FIG. 3 is a table indicating the states of the clutches and resulting speed ratio of the transmission in FIG. 1 when the gears have the number of teeth indicated in FIG. 2.

DETAILED DESCRIPTION OF THE INVENTION

Figures 1, 2:
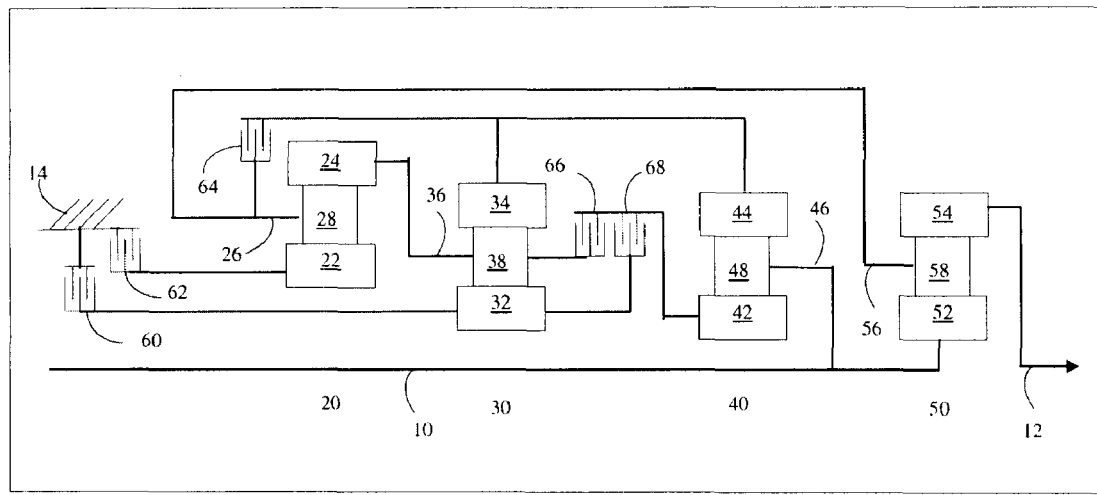
FIG. 1 is a schematic diagram of a transmission which produces eight forward speed ratios and one reverse speed ratio.
FIG. 2 is a table showing the proposed tooth numbers for the gears of the transmission illustrated in FIG. 1.

A transmission according to the present invention is illustrated in FIG. 1. Input shaft 10 is driven by the vehicle's engine, preferably via a torsional damper that absorbs combustion pulses. Output shaft 12 drives the vehicle wheels, preferably via a driveshaft, a differential assembly, and rear axle shafts. A transmission case 14 provides support for the gear sets, shafts, clutches, and brakes.

The transmission contains four simple planetary gear set assemblies 20, 30, 40, and 50. Each simple planetary gear set assembly has a sun gear, a ring gear with an internal gear mesh, a planet carrier, and a set of planet gears supported for rotation on the carrier and meshing with both the sun gear and the ring gear. A recommended number of gear teeth for each of these gears is shown in FIG. 2.

Input shaft 10 drives sun gear 52 and planet carrier 46. Output shaft 12 is driven by ring gear 54. Carrier 26 is connected to carrier 56, ring gear 24 is connected to carrier 36, and ring gear 34 is connected to ring gear 44.

Brakes 60 and 62 and clutches 64, 66, and 68 are preferably hydraulically actuated friction clutches which releasably connect two elements when hydraulic pressure is applied and disconnect those elements when the hydraulic pressure is released. Brake 60 releasably connects sun gear 32 to the transmission case 14. Brake 62 releasably connects sun gear 22 to the transmission case 14. Clutch 64 releasably connects carrier 26 and carrier 56 to ring gear 34 and ring gear 44. Clutch 66 releasably connects ring gear 24 and carrier 36 to sun gear 42. Clutch 68 releasably connects sun gear 32 to sun gear 42.

The transmission ratio is selected by applying hydraulic pressure to three of the clutches and brakes as indicated in FIG. 3.

The transmission is prepared for forward motion in first gear by applying brake 62 and clutch 66. To launch the vehicle, brake 60 is gradually engaged. Alternatively, the transmission may be equipped with a launch device such as a torque converter or a dedicated launch clutch. If the transmission is so equipped, it is prepared for forward motion by applying brakes 60 and 62 and clutch 66 and launching the vehicle using the launch device.

To shift to second gear, clutch 68 is progressively engaged while clutch 66 is progressively released, maintaining brakes 60 and 62 fully applied. To shift from second to third gear, clutch 66 is progressively engaged while brake 60 is progressively released, maintaining brake 62 and clutch 68 fully applied. To shift from third to fourth gear, clutch 64 is progressively engaged while clutch 66 is progressively released, maintaining brake 62 and clutch 68 fully applied. To shift from fourth to fifth gear, clutch 66 is progressively engaged while clutch 68 is progressively released, maintaining brake 62 and clutch 64 fully applied. To shift from fifth to sixth gear, clutch 68 is progressively engaged while brake 62 is progressively released, maintaining clutches 64 and 66 fully applied. To shift from sixth to seventh gear, brake 60 is progressively engaged while clutch 68 is progressively released, maintaining clutches 64 and 66 fully applied. Finally, to shift from seventh to eighth gear, clutch 68 is progressively engaged while clutch 66 is progressively released, maintaining brake 60 and clutch 64 fully applied.

Downshifting to a lower gear is accomplished by reversing the steps described above for the corresponding upshift.

The transmission is prepared for reverse motion by applying brake 62 and clutch 64. To launch the vehicle, brake 60 is gradually engaged. If the transmission is equipped with a launch device, it is prepared for reverse motion by applying brakes 60 and 62 and clutch 64 and launching the vehicle using the launch device.

A transmission embodiment according to this invention contains four epicyclic gearing assemblies, each with three members that rotate around a common axis. In each epicyclic gearing assembly, the speeds of the three elements are linearly related. The second rotating elements is constrained to rotate at a speed which is a weighted average of the speeds of the first and third elements. The weighting factors are determined by the configuration of the epicyclic gearing assembly and the ratios of the numbers of gear teeth. In FIG. 1, all four epicyclic gearing assemblies are simple planetary gear sets. Other types of epicyclic gearing assemblies include double pinion planetary gear sets, stepped pinion planetary gear sets, and coplanar gear loops as described in U.S. Pat. Nos. 5,030,184 and 6,126,566. Other types of epicyclic gearing assemblies may be substituted without departing from the present invention.

In accordance with the provisions of the patent statutes, the structure and operation of the preferred embodiment has been described. However, it should be noted that alternate embodiments can be practiced otherwise than as specifically illustrated and described.

What is claimed is:

1. A multiple speed power transmission comprising:
   an input shaft (10);
   a first epicylic gearing assembly (50) comprising:
      a first sun gear (52);
      a first planet carrier (56);
      a first ring gear (54); and
      a first set of planet gears (58) supported for rotation on the first planet carrier and in meshing engagement with both the first sun gear and the first ring gear;
   an output shaft (12) connected to the first ring gear (54); and
   second (20), third (30), and fourth (40) epicylic gearing assemblies each comprising first, second, and third rotating elements, wherein:
      the third rotating element of the second epicyclic gearing assembly (24) is connected to the second rotating element of the third epicyclic gearing assembly (36);
      the third rotating element of the third epicyclic gearing assembly (34) is connected to the third rotating element of the fourth epicyclic gearing assembly (44);

the second rotating element of the second epicyclic gearing assembly (26) is connected to the first planet carrier (56); and the second rotating element of the fourth epicyclic gearing assembly (46), the first sun gear (52), and the input shaft (10) are mutually connected.

2. The multiple speed power transmission of claim 1, wherein the second epicyclic gearing assembly (20) is a simple planetary gear set comprising:
   a second sun gear (22) as the first rotating element;
   a second planet carrier (26) as the second rotating element;
   a second ring gear (24) as the third rotating element; and
   a second set of planet gears (28) supported for rotation on the second planet carrier and in meshing engagement with both the second sun gear and the second ring gear.

3. The multiple speed power transmission of claim 1, wherein the third epicyclic gearing assembly (30) is a simple planetary gear set comprising:
   a third sun gear (32) as the first rotating element;
   a third planet carrier (36) as the second rotating element;
   a third ring gear (34) as the third rotating element; and
   a third set of planet gears (38) supported for rotation on the third planet carrier and in meshing engagement with both the third sun gear and the third ring gear.

4. The multiple speed power transmission of claim 1, wherein the fourth epicyclic gearing assembly (40) is a simple planetary gear set comprising:
   a fourth sun gear (42) as the first rotating element;
   a fourth planet carrier (46) as the second rotating element;
   a fourth ring gear (44) as the third rotating element; and
   a fourth set of planet gears (48) supported for rotation on the fourth planet carrier and in meshing engagement with both the fourth sun gear and the fourth ring gear.

5. A multiple speed power transmission comprising:
   an input shaft (10);
   an output shaft (12);
   first (50), second (20), third (30), and fourth (40) epicyclic gearing assemblies each comprising first, second, and third rotating elements, wherein:
      the third rotating element of the first epicyclic gearing assembly (54) is connected to the output;
      the third rotating element of the second epicyclic gearing assembly (24) is connected to the second rotating element of the third epicyclic gearing assembly (36);
      the third rotating element of the third epicyclic gearing assembly (34) is connected to the third rotating element of the fourth epicyclic gearing assembly (44);
      the second rotating element of the second epicyclic gearing assembly (26) is connected to the second rotating element of the first epicyclic gearing assembly (56); and
      the second rotating element of the fourth epicyclic gearing assembly (46), the first rotating element of the first epicyclic gearing assembly (52), and the input shaft (10) are mutually connected; and
   a first brake (60) for selectively holding against rotation the first rotating element of the third epicyclic gearing assembly (32);
   a second brake (62) for selectively holding against rotation the first rotating element of the second epicyclic gearing assembly (22);
   a first clutch (64) for releasably connecting the second rotating element of the first epicyclic gearing assembly (56) and the second rotating element of the second epicyclic gearing assembly (26) to the third rotating element of the third epicyclic gearing assembly (34) and the third rotating element of the fourth epicyclic gearing assembly (44);
   a second clutch (66) for releasably connecting the first rotating element of the fourth epicyclic gearing assembly (42) to the third rotating element of the second epicyclic gearing assembly (24) and the second rotating element of the third epicyclic gearing assembly (36); and
   a third clutch (68) for releasably connecting the first rotating element of the fourth epicyclic gearing assembly (42) to the first rotating element of the third epicyclic gearing assembly (32).

6. The multiple speed power transmission of claim 5, wherein the second rotating element of each epicyclic gearing assembly is constrained to rotate at a speed between the speeds of the respective first and third rotating elements.

7. A multiple speed power transmission, comprising:
   an output shaft (12); and
   first (50), second (20), third (30), and fourth (40) epicyclic gearing assemblies each comprising first, second, and third rotating elements, wherein:
      the second rotating element of each epicyclic gearing assembly is constrained to rotate at a speed between the speeds of the respective first and third rotating elements;
      the third rotating element of the second epicyclic gearing assembly (24) is connected to the second rotating element of the third epicyclic gearing assembly (36);
      the third rotating element of the third epicyclic gearing assembly (34) is connected to the third rotating element of the fourth epicyclic gearing assembly (44);
      the second rotating element of the second epicyclic gearing assembly (26) is connected to the second rotating element of the first epicyclic gearing assembly (56);
      the second rotating element of the fourth epicyclic gearing assembly (46) is connected to the first rotating element of the first epicyclic gearing assembly (52); and
      the output shaft (12) is connected to the third rotating element of the first epicyclic gearing assembly (54).

8. The multiple speed power transmission of claim 7, further comprising an input shaft (10) connected to the first rotating element of the first epicyclic gearing assembly (52) and the second rotating element of the fourth epicyclic gearing assembly (46).

9. The multiple speed power transmission of claim 8, further comprising:
   a first brake (60) for selectively holding against rotation the first rotating element of the third epicyclic gearing assembly (32);
   a second brake (62) for selectively holding against rotation the first rotating element of the second epicyclic gearing assembly (22);
   a first clutch (64) for releasably connecting the second rotating element of the first epicyclic gearing assembly (56) and the second rotating element of the second epicyclic gearing assembly (26) to the third rotating element of the third epicyclic gearing assembly (34) and the third rotating element of the fourth epicyclic gearing assembly (44);
   a second clutch (66) for releasably connecting the first rotating element of the fourth epicyclic gearing assembly (42) to the third rotating element of the second epicyclic gearing assembly (24) and the second rotating element of the third epicyclic gearing assembly (36); and a third clutch (68) for releasably connecting the first rotating element of the fourth epicyclic gearing assembly (42) to the first rotating element of the third epicyclic gearing assembly (32).

10. A multiple speed power transmission, comprising:
an output shaft (12);
a first sun gear (52);
a first planet carrier (56);
a first ring gear (54) connected to the output shaft;
a first set of planet gears (58) supported for rotation on the first planet carrier and in meshing engagement with both the first sun gear and the first ring gear;
a second sun gear (22);
a second planet carrier (26) connected to the first planet carrier (56);
a second ring gear (24);
a second set of planet gears (28) supported for rotation on the second planet carrier and in meshing engagement with both the second sun gear and the second ring gear;
a third sun gear (32);
a third planet carrier (36) connected to the second ring gear (24);
a third ring gear (34);
a third set of planet gears (38) supported for rotation on the third planet carrier and in meshing engagement with both the third sun gear and the third ring gear;
a fourth sun gear (42);
a fourth planet carrier (46) connected to the first sun gear (52);
a fourth ring gear (44) connected to the third ring gear (34); and
a fourth set of planet gears (48) supported for rotation on the fourth planet carrier and in meshing engagement with both the fourth sun gear and the fourth ring gear.

11. The multiple speed power transmission of claim 10, further comprising an input shaft (10) connected to the first sun gear (52) and the fourth planet carrier (46).

12. The multiple speed power transmission of claim 11, further comprising:
a first brake (60) for selectively holding against rotation the third sun gear (32);
a second brake (62) for selectively holding against rotation the second sun gear (22);
a first clutch (64) for releasably connecting the first planet carrier (56) and the second planet carrier (26) to the third ring gear (34) and the fourth ring gear (44);
a second clutch (66) for releasably connecting the fourth sun gear (42) to the second ring gear (24) and the third planet carrier (36); and
a third clutch (68) for releasably connecting the fourth sun gear (42) to the third sun gear (32).

\* \* \* \* \*